Jan. 31, 1950     D. W. WHITE, JR., ET AL     2,496,029
WIRE TESTER
Filed July 31, 1946
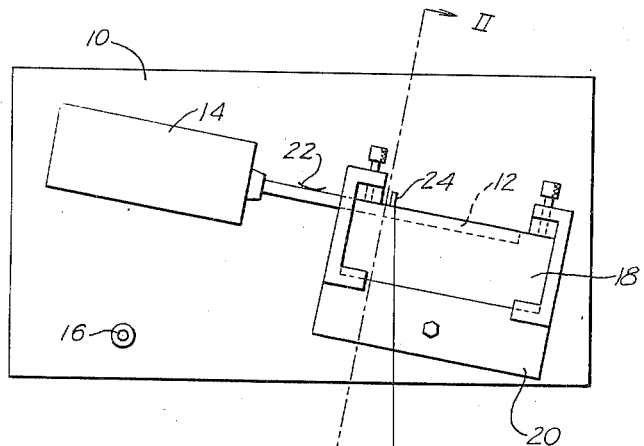
*Fig. 1*
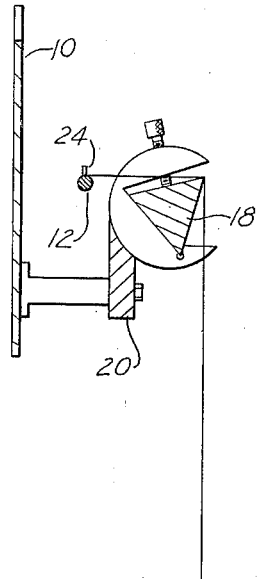
*Fig. 2*
*Fig. 5*
*Fig. 3*
*Fig. 4*
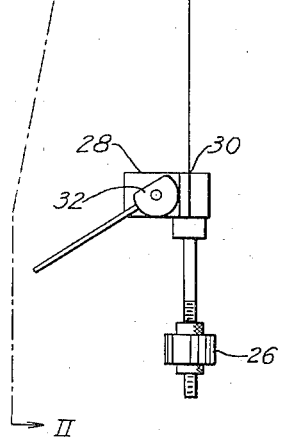
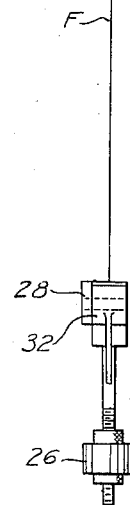
INVENTORS
Donald W. White, Jr. and
Rolland M. Zabel
BY
*ATTORNEY*

Patented Jan. 31, 1950

2,496,029

UNITED STATES PATENT OFFICE 2,496,029

WIRE TESTER

Donald W. White, Jr., Flushing, N. Y., and Rolland M. Zabel, Melrose, Mass., assignors to Sylvania Electric Products, Inc., a corporation of Massachusetts Application July 31, 1946, Serial No. 687,492

15 Claims. (Cl. 73—93)

The present invention relates to a method and to apparatus for testing wire.

In testing wire, such as fine gauge tungsten filament wire, flawless wire is not distinguishable from wire having longitudinal fissures by tensile test. It has heretofore been customary to prepare polished and etched transverse wire sections and to examine these specimens microscopically to detect fissures. Because the fissures are usually discontinuous along the wire, numerous tests of this type are required in order to reveal quality of a given reel of wire. The preparation of the samples is time-consuming, expensive, and requires a high degree of skill. Accordingly, the principal purpose of this invention is to provide a simple, effective, and rapid fissure test for wire. A further object is to devise a purely physical test and testing apparatus which will be effective to detect longitudinal fissures in wire.

The invention resides partly in the discovery that when wire having a longitudinal fissure is sharply bent in proper relationship to the fissure and is then straightened and subjected to tension, the maximum load which it can withstand is greatly reduced as compared with the maximum load of flawless wire similarly bent, straightened and tensioned. Were the wire brittle, as in the case of recrystallized tungsten wire, the mere bending would be likely to cause it to break. The present invention essentially includes the application of a critical minimum of tension (in relation to the wire size and other factors) after the wire has been sharply bent.

The fissures to be detected are usually long, but they may be discontinuous. It is here proposed that a series of bends be made in any given specimen. This provides assurance that the bend will not be made between two discontinuous longitudinal fissures.

The angle of the fissure plane with respect to the axis of the bend is critical, since the bend causes greater weakening of the wire for certain angles than for others. According to a further feature of the invention, the axis of each of a series of bends should be progressively displaced from the others. In this way, it will be reasonably certain that, at some point along any fissure that may be present, the angle will be at least approximately ideal for revealing the fissure.

It is possible to make the series of bends continuous by drawing the wire over a knife edge. The angle of the axis of one bend, in a continuous series of bends, with respect to the plane of the fissure may be made optimum at some point along the wire by rotating the wire as it is drawn across the knife edge. Apparatus devised to perform this knife-edge test comprises certain other novel features of the invention as will appear below.

The invention will be better understood from the following detailed specification and the drawings in which:

Fig. 1 is a front elevation of one preferred form of apparatus for accomplishing the novel test;

Fig. 2 is a sectional view along the line II—II of Fig. 1;

Fig. 3 is a sectional view of untested, typically fissured wire; and

Fig. 4 is a sectional view of stressed and typically fissured tungsten wire. Both Figs. 3 and 4 are greatly magnified.

Fig. 5 is a typical fragmentary view, greatly enlarged, of a ruptured test sample which initially had a longitudinal fissure.

The present invention was made primarily to meet the need for a rapid but reliable test for fissures in wire of an essentially fibrous structure, as tungsten filament wire, but is applicable in testing wire of other material.

Fissures found in tungsten filament wire ordinarily extend only part way into the wire from its surface, as shown in Fig. 3, and there may be one or more fissures at any point along a wire sample. When the wire is bent sharply, any fissure that may be present is propagated in one or more paths across the wire at the bend, thus dividing the wire into two or more separate strands at this point. (See Fig. 4.) The sharp bend also causes some of these individual strands to elongate plastically more than the others. When the wire is thereupon straightened and tensioned properly, the strands are called upon individually and separately to support the full tensile load. Inasmuch as each individual strand is unable to support the full load, the wire breaks by the progressive, step-like failure of the individual strands.

The orientation of such fissure or fissures with respect to the axis of the bend made in the proposed test has been proven to be an important factor in the behavior of the wire under test. The tested wire will break with a minimum tensile load for some critical or most favorable orientation of the bend with respect to the fissure, although there may be more than one of such critical orientations of the fissures with respect to the bend. According to experimental data, the minimum tensile strength of critically bent-and-straightened fissured tungsten wire may be of the order of 15% or 20% of its normal tensile breaking load (the load required to break wire under normal tensile tests without having previously subjected the wire to sharp bending). In the most unfavorable orientation of the fissure with respect to the axis of bend, the tensile load required to break the bent-and-straightened fissured wire may be as high as 80% of the normal tensile breaking load of the wire. When flawless wire is subjected to this bending and straightening test its tensile strength is reduced to 80% or 90% of its previous strength. Therefore, the failure of fissured wire in this test requires relatively critical orientation of the fissure with respect to the axis of the bend, where the tension applied is insufficient to break flawless wire.

The depth of the fissure or fissures is believed to be an important factor in the behavior of the wire under test. By changing the radius of the bend and/or the tensile load which is applied after bending and straightening the wire of any given gauge, the sensitivity of the test may be varied. That is, the minimum ratio of fissure depth to wire diameter for which fissured wire can be distinguished from fissureless wire by this test may be decreased by reducing the radius of the bend and/or increasing the tensile load which is applied after bending and straightening the wire. By varying the test conditions in such manner, the sensitivity may be adjusted so that only wire having a predetermined minimum of fissure depth will fail under the test. The minimum tensile load applied to bent and straightened tungsten filament wire is of the order of 15% to 20% of the tensile strength of the wire before test to reveal the most pronounced fissures, but greater loads are required to detect minor fissures.

For any given degree of test sensitivity, the wire size or diameter governs the sharpness of the bend and the tensile load applied. The larger sizes of wire call for bends of less sharpness and for greater loads than do the finer wires.

The terms "sharp" and "sharpness" as applied to bends and to the selected edges over which the bends may be formed refer to the abruptness with which the wire changes direction and to the corresponding edge contour, respectively. In the preferred form of bend a parti-cylindrical edge is used in forming the bend, and, for routine testing, both the radii of curvature of the bends and the tensile loads are standardized for various wire sizes at several degrees of test sensitivity. The over-all angle through which the wire is bent is also a factor, but is kept constant in the routine test at about 90°.

A preferred form of apparatus for effecting the test described above is shown in Figs. 1 and 2. Motor and reduction gearing unit 14 on base 10 supports and rotates shaft 12 to draw filament F over a knife edge on member 18. Supports 20 maintain the knife edge of member 18 close to shaft 12. Member 18 has three edges of different sharpness and is positionable to apply any desired edge to the test specimen. Wire or filament F is wound about clip 22 and passes around pin 24 on shaft 12 before extending horizontally to the knife edge and downward to weight assembly 28. Jaws 30 of the weight assembly, operated by cam 32, effectively secure the weight to filament F. Push-button switch 16 is pressed when it is desired to energize the motor within unit 14.

Before testing a given sample of wire, member 18 is positioned to expose one of its knife edges of sharpness appropriate to the size of wire to be tested and weights 26 are attached to assembly 28 according to a predetermined schedule. One end of the wire is wrapped around clip 22 and the wire is passed around pin 24 and over the knife edge, down to jaws 30 of weight assembly 28.

The assembly is so supported that when motor assembly 14 is energized to wind the wire about shaft 12, the weight assembly is lifted gradually, top end first. This avoids a sudden impact load on the wire or filament F. The motor is operated until the wire fails, revealing a fissure, or until the weight reaches its upper limit, proving the wire to be free of fissures.

Examples of standards used in testing wire with the foregoing apparatus may be of interest. For testing three-mil tungsten wire, having a graphite coating such as is used for lubrication in wire drawing, a knife edge of four-mil radius is used in combination with a total weight of 275 grams, a severe test to detect even minor fissures. Prominent fissures will be detected with as low as 150 grams, whereas none of such fissures would be revealed in tensile tests alone. The sensitivity of the test may alternatively be changed by an edge having a different radius of curvature. Evidently a very wide radius of bend is conceivable, as by passing the wire over a large wheel; but such a test would be an ordinary tensile test. Such a wheel would be perhaps thousands of times the diameter of the wire, whereas the radius of the sharp bend used in the fissure test described is of the same order of magnitude as the wire diameter.

In Fig. 1 it is apparent that shaft 12 and the knife edge on member 18 are both inclined. The effect of this is to cause filament F gradually to drift down the slope as it is wound upon shaft 12. In consequence, the wire rotates about its longitudinal axis as it is bent over the knife edge, shifting the plane of a fissure into such position that the wire is least able to withstand the treatment. Furthermore, the lateral shift of the wire is effective to distribute the wear of the knife edge along its entire length.

The above description is concerned with a specific form of apparatus which has been found simple but effective in accomplishing the method described. Other forms of apparatus, as well as several variations of that described, will occur to those skilled in the art. For example, a driven screw may be arranged to shift a wire guide along the knife edge in place of the inclination of the parts as is shown. In substitution for weight assembly 28, friction-loaded rolls may be used as a drag on the wire. The weight assembly may be used to withdraw wire from shaft 12 or from a reel, simply by reversing the direction of rotation of that shaft or reel. These and such other modifications as will be apparent to those skilled in the art are within the purview of the invention as embodied in the appended claims.

What is claimed is:

1. The method of revealing longitudinal fissures in wire having fissures extending only part way into the wire, which method comprises the steps of sharply stressing wire by bending it over a radius of the same order of magnitude as the wire diameter to propagate the fissures entirely through the wire thus dividing the wire into separate strands and elongating said strands unequally, and then subjecting the multi-strand wire to a straight tensile load sufficient to break the unequally elongated strands but insufficient to cause fissureless wire to fail in tension.

2. The method of testing wire of essentially a fibrous structure that may have longitudinal fissures, comprising the steps of making a comparatively sharp bend in the wire, the radius of the bend being of the same order of magnitude as the wire diameter, and subjecting the wire with the bend unsupported to tension insufficient to break flawless wire but sufficient to break wire having a significant longitudinal fissure in the region of the bend.

3. The method of testing wire for flaws comprising the steps of making a series of equally sharp bends along a sample of the wire, the axes of the successive bends being progressively angularly displaced from the axis of the first bend, and subjecting the wire to tension insufficient to break flawless wire but sufficient to break wire having a significant longitudinal fissure.

4. The method of testing round wire for flaws comprising the steps of making a continuous series of equally sharp bends along a sample of the wire, the radius of the bends being of the same order of magnitude as the wire diameter, the axes of the successive bends being progressively angularly displaced from the axis of the first bend, and with the bends unsupported, subjecting the wire to tension insufficient to break flawless wire but sufficient to break wire having a significant longitudinal fissure.

5. The method of testing wire for fissures comprising the steps of making a series of equally sharp bends along a sample of the wire, the axes of the successive bends being progressively angularly displaced from the axis of the first bend, straightening the wire, and subjecting the straightened wire to tension insufficient to break flawless wire but sufficient to break wire having a significant longitudinal fissure.

6. The method of testing round wire for fissures comprising the steps of making a continuous series of equally sharp bends along a sample of the wire, the radius of the bends being of the same order of magnitude as the wire diameter, the axes of the successive bends being progressively angularly displaced from the axis of the first bend, straightening the wire, and subjecting the straightened wire to tension insufficient to break flawless wire but sufficient to break wire having a significant longitudinal fissure.

7. The method of testing wire of essentially a fibrous structure that may have longitudinal fissures, comprising the steps of bending the wire across a relatively sharp edge having a radius of the same order of magnitude as the diameter of the wire to be tested, and drawing the wire longitudinally over said edge while subjecting it to tension insufficient to break flawless wire but sufficient to break wire having a significant longitudinal fissure.

8. The method of testing round wire for flaws comprising the steps of bending the wire over a relatively sharp edge and rotating the wire while drawing it longitudinally over said edge under tension insufficient to break flawless wire but sufficient to break wire having a significant longitudinal fissure.

9. Apparatus for testing round wire comprising means for forming a series of bends of predetermined sharpness along a sample thereof, means to cause said bending means to displace the axis of the bends progressively about the longitudinal axis of the wire, means for displacing the bent wire from the bending means, and means for applying measured tension to the displaced bent wire while the bends are unsupported.

10. Apparatus for testing wire comprising means for uniformly tensioning a sample thereof, a relatively sharp edge having a radius of the same order of magnitude as the diameter of the wire to be tested transverse of said sample and so positioned in relation to said tensioning means as to provide angularly related lengths of wire, and means to draw the wire across said edge and to move it gradually along said edge.

11. Apparatus for testing round wire comprising means for uniformly tensioning a length thereof, a relatively sharp edge transverse of said length and so positioned as to provide angularly related lengths of wire approaching and leaving said edge, and means to draw the wire across said edge, and to move it gradually along said edge and to rotate the wire about its axis.

12. Apparatus for testing wire comprising means for uniformly tensioning a sample thereof, a relatively sharp edge transverse of said sample and so positioned as to provide angularly related lengths of wire, means to draw the wire across said edge, and means to move it gradually along said edge.

13. Apparatus for testing round wire comprising means for uniformly tensioning a sample thereof, a relatively sharp edge transverse of the path of said sample and so positioned as to provide angularly related lengths of wire, means to draw the wire across said edge, and means to move it gradually along said edge and to rotate the wire about its axis.

14. The method of testing fibrous wire of the type that may develop longitudinal fissures which comprises the steps of forming a continuous series of bends in the wire the radius of the bends being of the order of magnitude of the wire diameter, and tensioning the wire and successively straightening the unsupported bends, the tension being sufficient to break fissured wire but insufficient to break sound wire.

15. Apparatus for wire testing comprising a member having a straight edge the sharpness of which is of the order of the magnitude of the diameter of the wire to be tested, means for drawing the test wire across said edge comprising a driven shaft and a tensioner acting on portions of the wire at opposite sides of said edge, and a holder for the edge to support it at an inclined angle in respect to the tensioned wire.

DONALD W. WHITE, JR.
ROLLAND M. ZABEL.

REFERENCES CITED

The following references are of record in the file of this patent:

UNITED STATES PATENTS

| Number | Name | Date |
|---|---|---|
| 889,993 | Vaughn et al. | June 9, 1908 |
| 2,002,770 | Field | May 28, 1935 |
| 2,002,977 | Carr | May 28, 1935 |
| 2,032,989 | Kenney et al. | Mar. 3, 1936 |

FOREIGN PATENTS

| Number | Country | Date |
|---|---|---|
| 740,502 | France | Nov. 14, 1932 |